United States Patent
Hung et al.

(10) Patent No.: US 10,870,341 B2
(45) Date of Patent: Dec. 22, 2020

(54) ELECTRIC VEHICLE AND CHASSIS THEREOF

(71) Applicant: NATIONAL TAIWAN NORMAL UNIVERSITY, Taipei (TW)

(72) Inventors: Yi-Hsuan Hung, Taipei (TW); Hsueh-Chung Han, Taipei (TW); Shao-Wei Chang, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 16/577,956

(22) Filed: Sep. 20, 2019

(65) Prior Publication Data
US 2020/0238808 A1     Jul. 30, 2020

(30) Foreign Application Priority Data

Jan. 28, 2019  (TW) ............................ 108103064 A
Jan. 28, 2019  (TW) ............................ 108103102 A

(51) Int. Cl.
*B60K 1/04*     (2019.01)
*H01M 2/10*     (2006.01)
(Continued)

(52) U.S. Cl.
CPC ................ *B60K 1/04* (2013.01); *B60L 50/66* (2019.02); *B60N 2/01* (2013.01); *B60P 1/6418* (2013.01);
(Continued)

(58) Field of Classification Search
CPC .............. B60K 1/04; B60K 2001/4022; B60K 2001/0455; B60Y 2400/12;
(Continued)

(56) References Cited

U.S. PATENT DOCUMENTS 8,540,272 B1 *   9/2013   Vitale ................... B62D 21/14
                                                  280/638
8,944,456 B2 *   2/2015   Tsukerman .......... B62D 31/003
                                                  280/638
(Continued)

FOREIGN PATENT DOCUMENTS

CN     105291869 A    2/2016
CN     106347460 A    1/2017
TW     201726448 A    8/2017

OTHER PUBLICATIONS

Taiwanese Search Report for Taiwanese Application No. 108103102, dated Dec. 6, 2019, with English translation.

*Primary Examiner* — John D Walters
*Assistant Examiner* — James J Triggs
(74) *Attorney, Agent, or Firm* — Birch, Stewart, Kolasch & Birch, LLP

(57) ABSTRACT

An electric vehicle includes a chassis and a seat assembly that includes a plurality of seats mounted to the chassis. The chassis includes a vehicle frame defining a mounting space, and a battery module disposed in the mounting space and including an outer battery unit that is mounted to the vehicle frame, and an inner battery unit that is coupled to the outer battery unit. The vehicle frame is operable to switch between an expanded state, where the inner battery unit is permitted to be coupled to the outer battery unit and the seats are spaced apart from each other, and a collapsed state, where the inner battery unit is prevented from being coupled to the outer battery unit and the seats are overlapped with each other.

13 Claims, 9 Drawing Sheets

(51) Int. Cl.
  *B62D 21/14*  (2006.01)
  *B60N 2/01*  (2006.01)
  *B60L 50/60*  (2019.01)
  *B60P 1/64*  (2006.01)
  *B60S 9/14*  (2006.01)
  *B62D 21/09*  (2006.01)
  *B62D 21/12*  (2006.01)
  *B60K 6/28*  (2007.10)
  *B60L 53/80*  (2019.01)

(52) U.S. Cl.
  CPC .............. B60S 9/14 (2013.01); B62D 21/09 (2013.01); B62D 21/12 (2013.01); B62D 21/14 (2013.01); H01M 2/1077 (2013.01); H01M 2/1083 (2013.01); *B60K 6/28* (2013.01); *B60K 2001/0422* (2013.01); *B60K 2001/0433* (2013.01); *B60K 2001/0455* (2013.01); *B60L 53/80* (2019.02); *B60Y 2200/91* (2013.01); *B60Y 2200/92* (2013.01); *B60Y 2400/112* (2013.01); *H01M 2220/20* (2013.01)

(58) Field of Classification Search
  CPC ........... B60Y 2200/91; B60Y 2400/112; Y02T 10/70; B60L 50/66; B60L 53/80; B62D 21/14; B60N 2/01; H01M 2220/20; H01M 2/1077
  See application file for complete search history.

(56) References Cited

U.S. PATENT DOCUMENTS

2016/0009135 A1* 1/2016 Jong ..................... B60B 35/109
  280/5.52
2017/0203801 A1* 7/2017 Hung ..................... B62D 61/12
2017/0305190 A1* 10/2017 Abramov ............ B60B 35/1036

* cited by examiner

ELECTRIC VEHICLE AND CHASSIS THEREOF

CROSS-REFERENCE TO RELATED APPLICATION

This application claims priority of Taiwanese Patent Application No. 108103102, filed on Jan. 28, 2019.

FIELD

The disclosure relates to an electric vehicle, and more particularly to an adjustable electric vehicle and a chassis thereof.

BACKGROUND

A body of a conventional electric vehicle is commonly manufactured using lightweight materials to reduce its overall weight, thereby conserving energy use of the electric vehicle. However, there is a threshold to how much energy can be conserved by reducing overall weight of the electric vehicle, thereby unable to greatly improve energy efficiency thereof. In addition, interior room of the electric vehicle is usually fixed and not adjustable, and is unable to satisfy various spatial demands of a user under difference circumstances.

SUMMARY

Therefore, an object of the present disclosure is to provide an electric vehicle that can alleviate at least one of the drawback of the prior art.

Another object of the present disclosure is to provide a chassis of an electric vehicle that can alleviate at least one of the drawback of the prior art.

According to the present disclosure, the electric vehicle includes a chassis and a seat assembly. The chassis includes a vehicle frame that defines a mounting space and a battery module that is disposed in the mounting space. The battery module includes an outer battery unit mounted to the vehicle frame, and an inner battery unit removably coupled to the outer battery unit. The seat assembly includes a plurality of seats that is mounted to the chassis. The vehicle frame is operable to switch between an expanded state, where the inner battery unit is permitted to be coupled to the outer battery unit and the seats are spaced apart from each other, and a collapsed state, where the inner battery unit is prevented from being coupled to the outer battery unit and the seats are overlapped with each other.

According to the present disclosure, the chassis of an electric vehicle includes a vehicle frame that defines a mounting space and a battery module that is disposed in the mounting space. The battery module includes an outer battery unit mounted to the vehicle frame, and an inner battery unit removably coupled to the outer battery unit. The vehicle frame is operable to switch between an expanded state, where the inner battery unit is permitted to be coupled to the outer battery unit, and a collapsed state, where the inner battery unit is prevented from being coupled to the outer battery unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
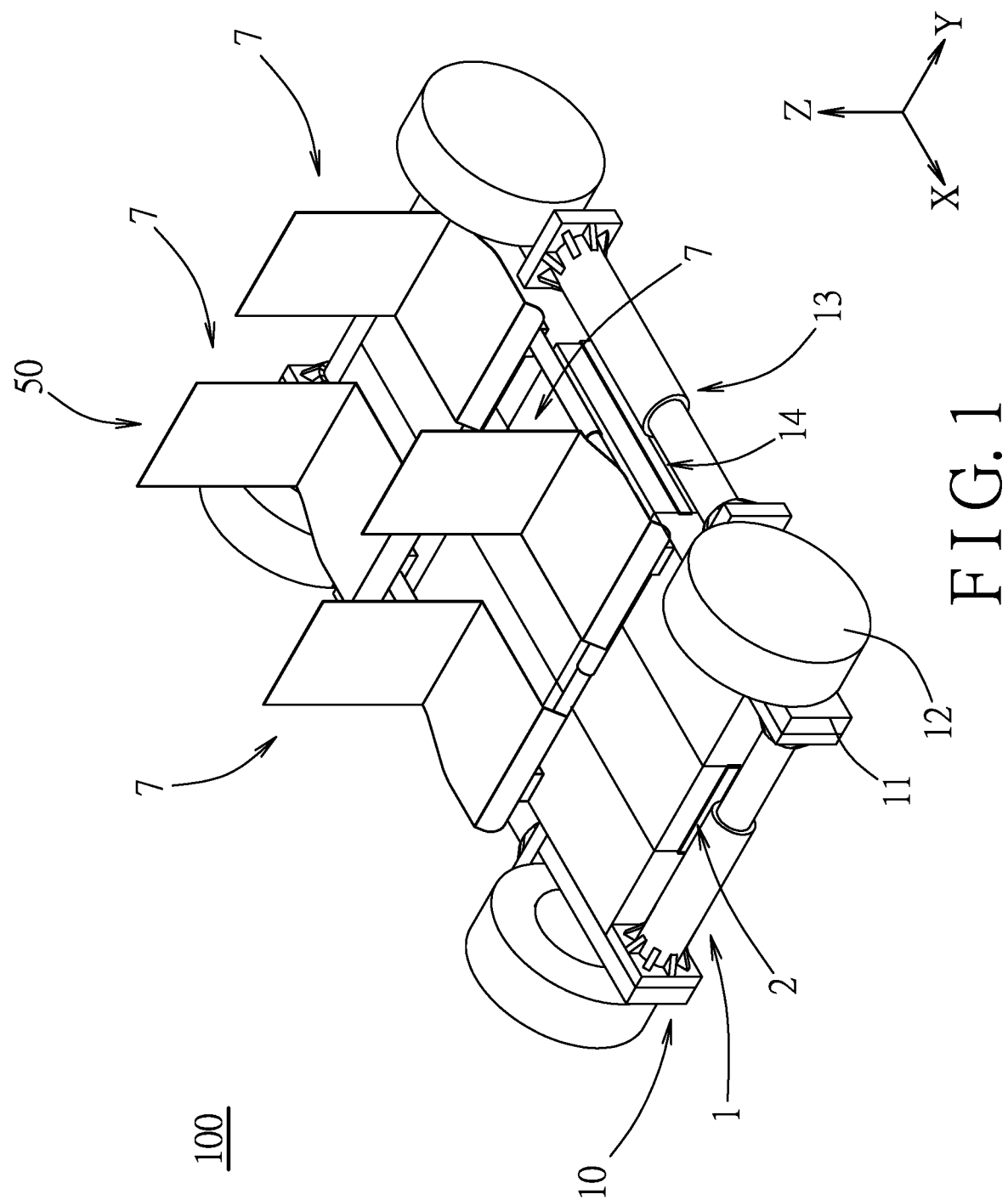
FIG. 1 is a perspective view of an embodiment of an electric vehicle according to the disclosure, illustrating a vehicle frame thereof in an expanded state.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
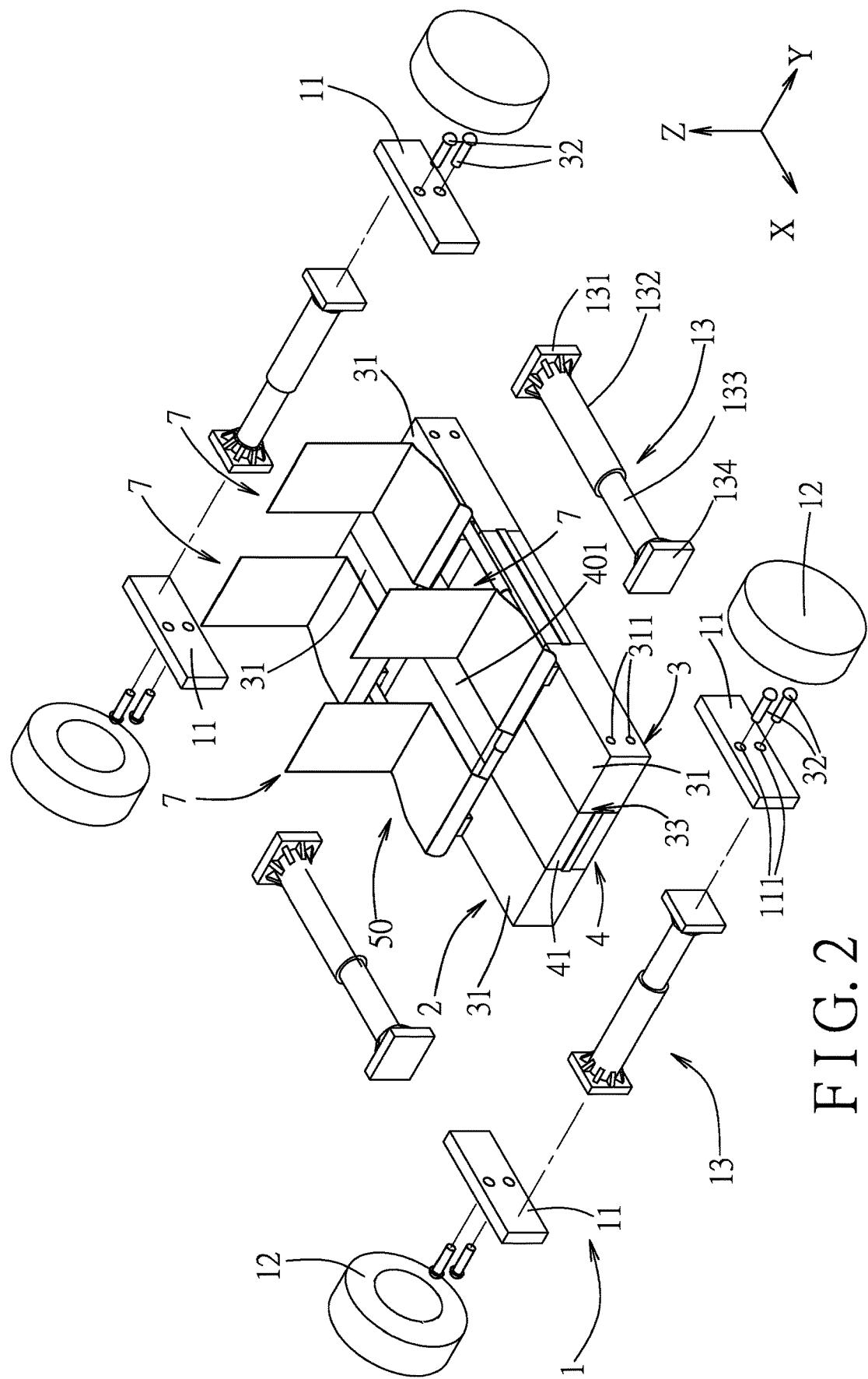
FIG. 2 is a partly exploded perspective view of the embodiment, illustrating interconnecting relationship among the vehicle frame, a battery module and a seat assembly.

Referring to FIGS. 1 and 2, an embodiment of an electric vehicle 100 according to the disclosure can be a battery electric vehicle (BEV), a hybrid electric vehicle (HEV) or a plug-in hybrid electric vehicle (PHEV). The electric vehicle 100 is permitted to travel in a front-rear direction (X). The electric vehicle 100 includes a chassis 10 and a seat assembly 50.

The chassis 10 includes a vehicle frame 1 and a battery module 2. The vehicle frame 1 has four corner plates 11 that respectively define four corners (front-left, front-right, rear-left, and rear-right respectively) of the electric vehicle 100, four wheels 12, and four first telescopic rods 13. Each of the corner plates 11 is made of a metallic material, is substantially rectangular, extends in the front-rear direction (X), and is formed with a plurality of through holes 111. Each of the wheels 12 is rotatably engaged to an outer surface of a respective one of the corner plates 11 via fasteners such as bolts and nuts. In one embodiment, each of the wheels 12 may include a built-in steering mechanism. Each of the first telescopic rods 13 has two opposite ends that are respectively and fixedly connected to two corresponding ones of the corner plates 11, such that the corner plates 11 and the first telescopic rods 13 cooperatively define a substantially rectangular mounting space 14 thereamong. Specifically, two of the first telescopic rods 13 are spaced apart from each other in the front-rear direction (X) and extend in a lateral direction (Y) perpendicular to the front-rear direction (X), and the remaining two of the first telescopic rods 13 are spaced apart from each other in the lateral direction (Y) and extend in the front-rear direction (X). In this embodiment, each of the first telescopic rods 13 is a hydraulic cylinder, and has a first connecting plate 131, a cylinder body 132 that is mounted to the connecting plate 131, a rod body 133 that is permitted to telescopically extend through the cylinder body 132, and a second connecting plate 134 that is mounted to an end of the rod body 133 distal to the first connecting plate 131. The first and second connecting plates 131, 134 of each of the first telescopic rods 13 are respectively and fixedly connected to the two corresponding ones of the corner plates 11 via welding. In other embodiments, the first and second connecting plates 131, 134 of each of the first telescopic rods 13 may be respectively and fixedly connected to the two corresponding ones of the corner plates 11 via bolts and nuts. By utilizing pressurized hydraulic fluid within the cylinder body 132, the vehicle frame 1 is operable to switch between an expanded state (see FIG. 1) and a collapsed state (see FIG. 7) by telescopically extending in both the front-rear direction (X) and the lateral direction (Y).

Figure 3:
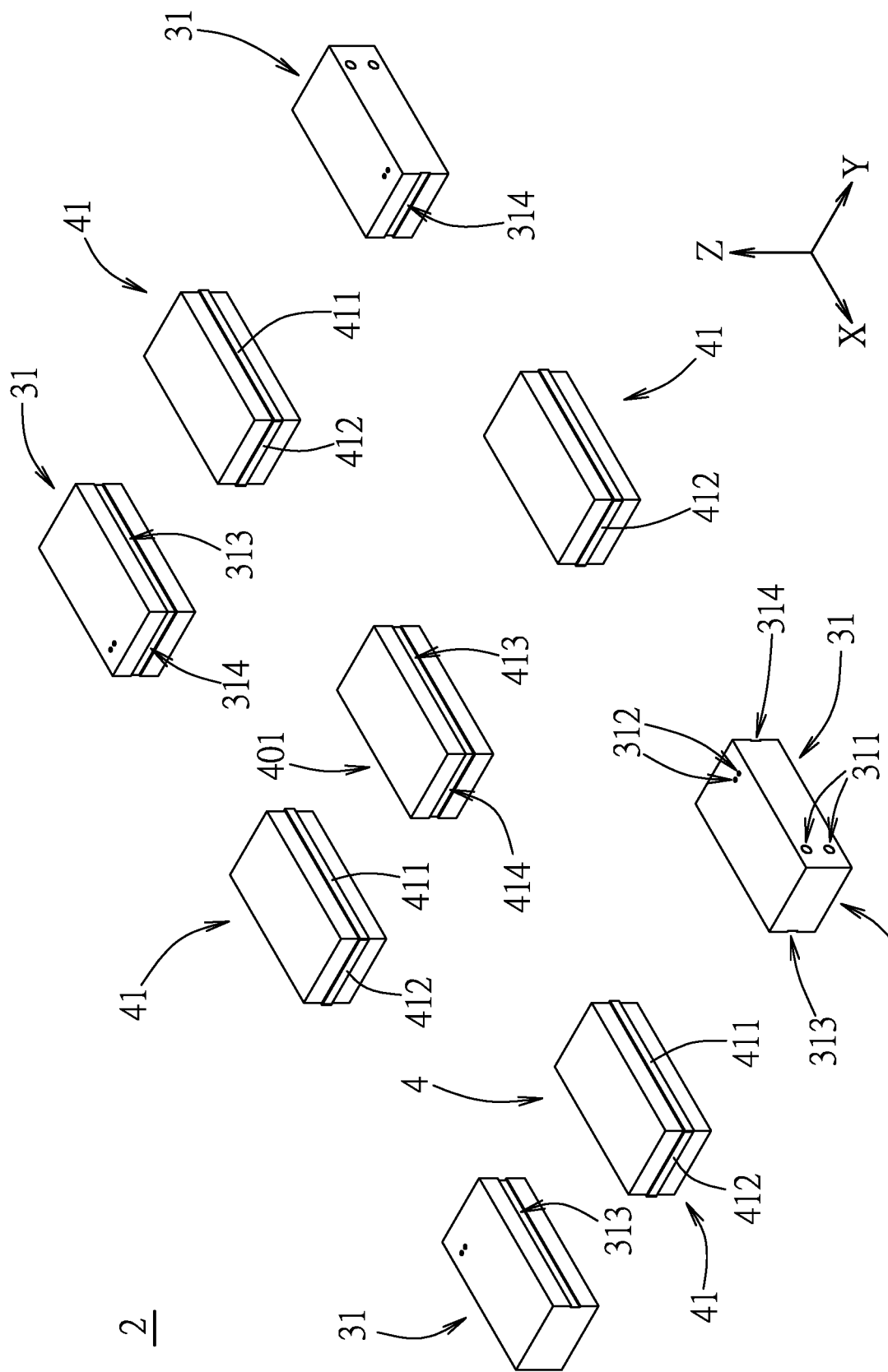
FIG. 3 is an exploded perspective view of the battery module of the embodiment, illustrating interconnecting relationship between an inner battery unit and an outer battery unit.

Referring to FIGS. 2 and 3, the battery module 2 is disposed in the mounting space 14 (as shown in FIG. 1) and includes an outer battery unit 3 mounted to the vehicle frame 1, and an inner battery unit 4 removably coupled to the outer battery unit 3. The outer battery unit 3 includes four outer batteries 31, each of which is formed with a plurality of first threaded holes 311 in an outer lateral surface thereof, and a plurality of second threaded holes 312 in a top surface thereof.

The outer batteries 31 are respectively and removably coupled to the outer lateral surfaces of the corner plates 11 of the vehicle frame 1 via a plurality of fasteners 32, each of which extends through a corresponding one of the through holes 111 of the corresponding one of the corner plates 11, and engages a corresponding one of the first threaded holes 311 of a corresponding one of the outer batteries 31. Each of the outer batteries 31 is further formed with a first guiding groove 313 that extends in the front-rear direction (X) and a second guiding groove 314 that extends in the lateral direction (Y). Specifically, the first guiding grooves 313 of two front ones of the outer batteries 31 face each other and are spaced apart from each other in the lateral direction (Y), and the two rear ones of the outer batteries 31 face each other and are spaced apart from each other in the lateral direction (Y). Likewise, the second guiding grooves 314 of two left ones of the outer batteries 31 face each other and are spaced apart from each other in the front-rear direction (X), and the second guiding grooves 314 of two right ones of the outer batteries 31 face each other and are spaced apart from each other in the front-rear direction (X). The outer batteries 31 are permitted to be in a separated state (FIG. 1) when the vehicle frame 1 is in the expanded state, or to be in a combined state (FIG. 7) when the vehicle frame 1 is in the collapsed state. In the separated state, the outer batteries 31 are separated from each other and cooperatively define a coupling space 33 for the inner battery unit 4 to be coupled thereamong. When the outer batteries 31 switches from the separated state to the combined state, the inner battery unit 4 is uncoupled from the outer batteries 31, and the outer batteries 31 abut against each other so as to prevent the inner battery unit 4 from being coupled thereamong.

The inner battery unit 4 includes four inner batteries 41 (front, rear, left, right respectively), each of which is to be removably coupled between corresponding two of the outer batteries 31, and a central battery 401 that is removably coupled to and to be disposed among the inner batteries 41. Each of the inner batteries 41 is formed with two first guiding tongues 411 that are respectively disposed at lateral surfaces thereof and two second guiding tongues 412 that are respectively disposed at front and rear surfaces thereof.

Each of the first guiding tongues 411 extends in the front-rear direction (X), and each of the second guiding tongues 412 extends in the lateral direction (Y). Each of the first guiding tongues 411 of the inner batteries 41 is permitted to be removably coupled to one of the first guiding grooves 313 of the outer batteries 31, and each of the second guiding tongues 412 of the inner batteries 41 is permitted to be removably coupled to one of the second guiding grooves 314 of the outer batteries 31. The central battery 401 has two third guiding grooves 413 that are respectively formed in lateral surfaces thereof and two fourth guiding grooves 414 that are respectively formed in front and rear surfaces thereof. Each of the third guiding grooves 413 extends in the front-rear direction (X), and each of the fourth guiding grooves 414 extends in the lateral direction (Y). Each of the third guiding grooves 413 is permitted to be removably coupled to one of the first guiding tongues 411, and each of the fourth guiding grooves 414 is permitted to be removably coupled to one of the second guiding tongues 412.

Figure 4:
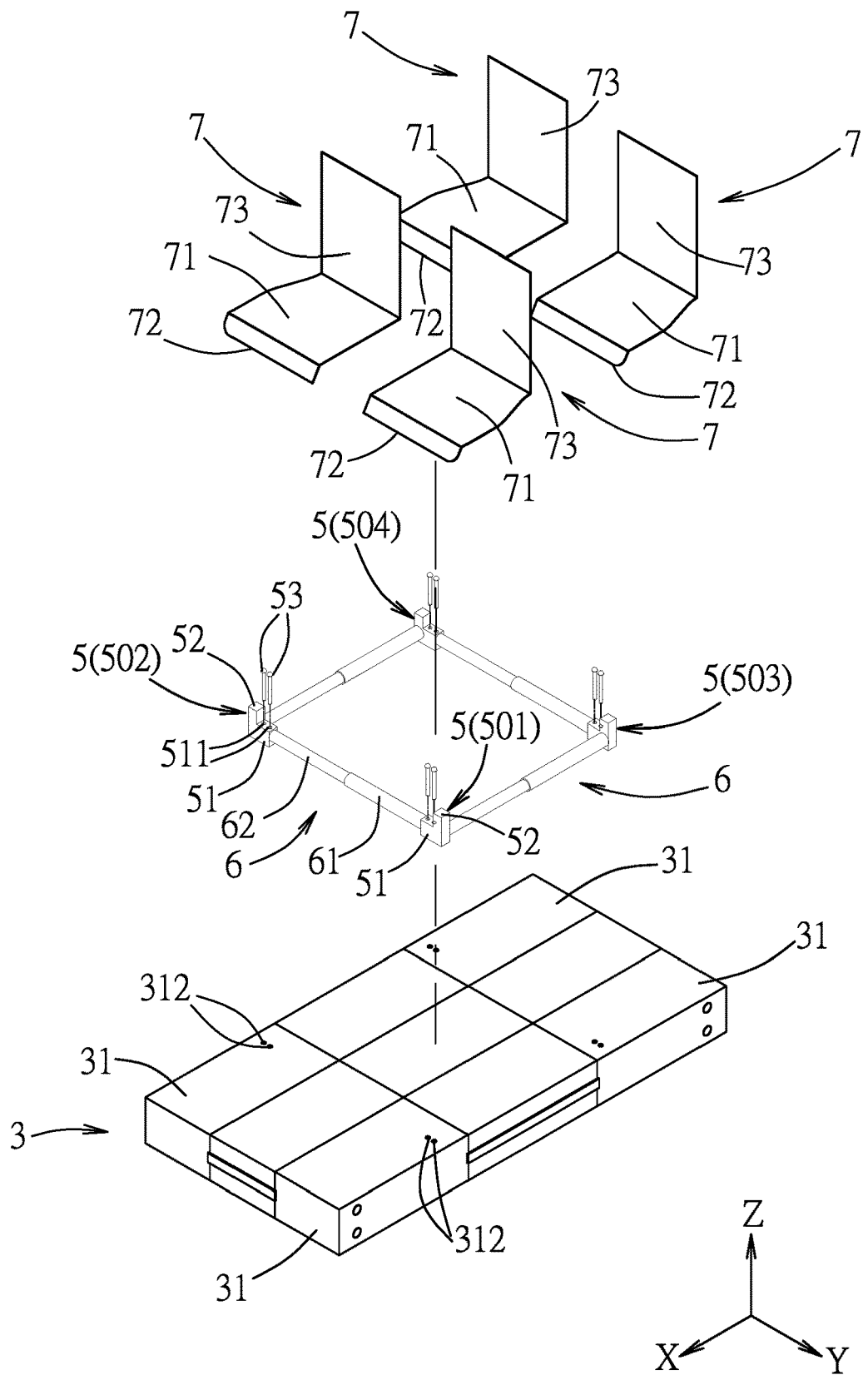
FIG. 4 is a partly exploded perspective view of the embodiment, illustrating interconnecting relationship between the battery module and the seat assembly.

Referring to FIGS. 2 and 4, the seat assembly 50 includes four seat supports 5, four second telescopic rods 6, and four seats 7. The seat supports 5 include a first support 501, a second support 502, a third support 503, and a fourth support 504, each of which is mounted to the top surface of a respective one of the outer batteries 31 and is for a respective one of the seats 7 to be mounted thereto. In this embodiment, the first support 501 is mounted to the top surface of the front-left one of the outer batteries 31, the second support 502 is mounted to the top surface of the front-right one of the outer batteries 31, the third support 503 is mounted to the top surface of the rear-left one of the outer batteries 31, the fourth support 504 is mounted to the top surface of the and rear-right respectively one of the outer batteries 31, such that the first and second supports 501, 502 are spaced apart from each other in the lateral direction (Y), the third and fourth supports 503, 504 are spaced apart from each other in the lateral direction (Y), the first and third supports 501, 503 are spaced apart from each other in the front-rear direction (X), and the second and fourth supports 502, 504 are spaced apart from each other in the front-rear direction (X). Each of the seat supports 5 has a first support body 51 that is formed with a plurality of support through holes 511 extending in a up-down direction (Z) perpendicular to the front-rear direction (X) and the lateral direction (Y), and a second support body 52. The support through holes 511 are respectively registered with the second threaded holes 312 of the corresponding ones of the outer batteries 31 for a plurality of support fastener 53 to extend therethrough, thereby mounting corresponding ones of the seat supports 5 to the corresponding ones of the outer batteries 31. The second support body 52 is formed at an outer side of the first support body 51, and has a top end that is higher than that of the first support body 51 in the up-down direction (Z). In this embodiment, the second support body 52 of the first support 501 is higher than that of the second support 502, the second support body 52 of the second support 502 is higher than that of said third support 503, and the second support body 52 of the third support 503 is higher than that of said fourth support 504.

Each of the second telescopic rods 6 has two opposite ends that are respectively and fixedly connected to first support bodies 51 of two corresponding ones of the seat supports 5. Two of the second telescopic rods 6 are spaced apart from each other in the front-rear direction (X) and extend in the lateral direction (Y), and the remaining two of the second telescopic rods 6 are spaced apart from each other in the lateral direction (Y) and extend in the front-rear direction (X). In this embodiment, each of the second telescopic rods 6 is a hydraulic cylinder, and has a cylinder body 61 and a rod body 62 that is permitted to telescopically extend through the cylinder body 61. Opposite ends of each of the second telescopic rods 6 are respectively and fixedly connected to the first support bodies 51 of two corresponding ones of the seat supports 5 via welding.

Each of the seats 7 has a sitting portion 71, a connecting portion 72 that is connected to a front end of the sitting portion 71, and a back portion 73 that is connected to a rear end of the sitting portion 71. The connecting portions 72 of the seats 7 are respectively and fixedly connected to a top end the second support bodies 52 of the seat supports 5 via welding, such that all of the seats 7 are disposed at different heights, with the seat 7 fixedly connected to the support body 52 of the first support 501 having the tallest height and being disposed at front-left corner of the electric vehicle 100, and the seat 7 fixedly connected to the support body 52 of the fourth support 504 having the shortest height and being disposed at rear-right corner of the electric vehicle 100. In other words, any two of the seats 7 arranged in the lateral direction (Y) are located relative to each other in such a way that one of the seats 7 is located higher in the up-down direction (Z). Likewise, any two of the seats 7 arranged in the front-rear direction (X) are located relative to each other in such a way that the front one of the seats 7 is located higher in the up-down direction (Z) than the rear one of the seats 7. In addition, any two of the seats 7 arranged in the lateral direction (Y) are located relative to each other in such a way that one of the seats 7 is located closer to a front end of the seat assembly 50 in the front-rear direction (X) than the other one of the seats 7.

By utilizing pressurized hydraulic fluid within the cylinder body 61 of each of the second telescopic rods 6, the rod body 62 thereof may move telescopically to drive movement of the outer batteries 31 between the separated state and the combined state, and to drive movement of the seats 7 between a spaced-apart state (see FIG. 1), where the seats 7 are spaced apart from each other, and an overlapping state (see FIG. 7), where the seats 7 are overlapped with each other. Referring back to FIGS. 1 and 2, when the seats 7 are in the spaced-apart state, all of the seats 7 are made to be available for use, optimal for catering to a group of passengers.

Figure 5:
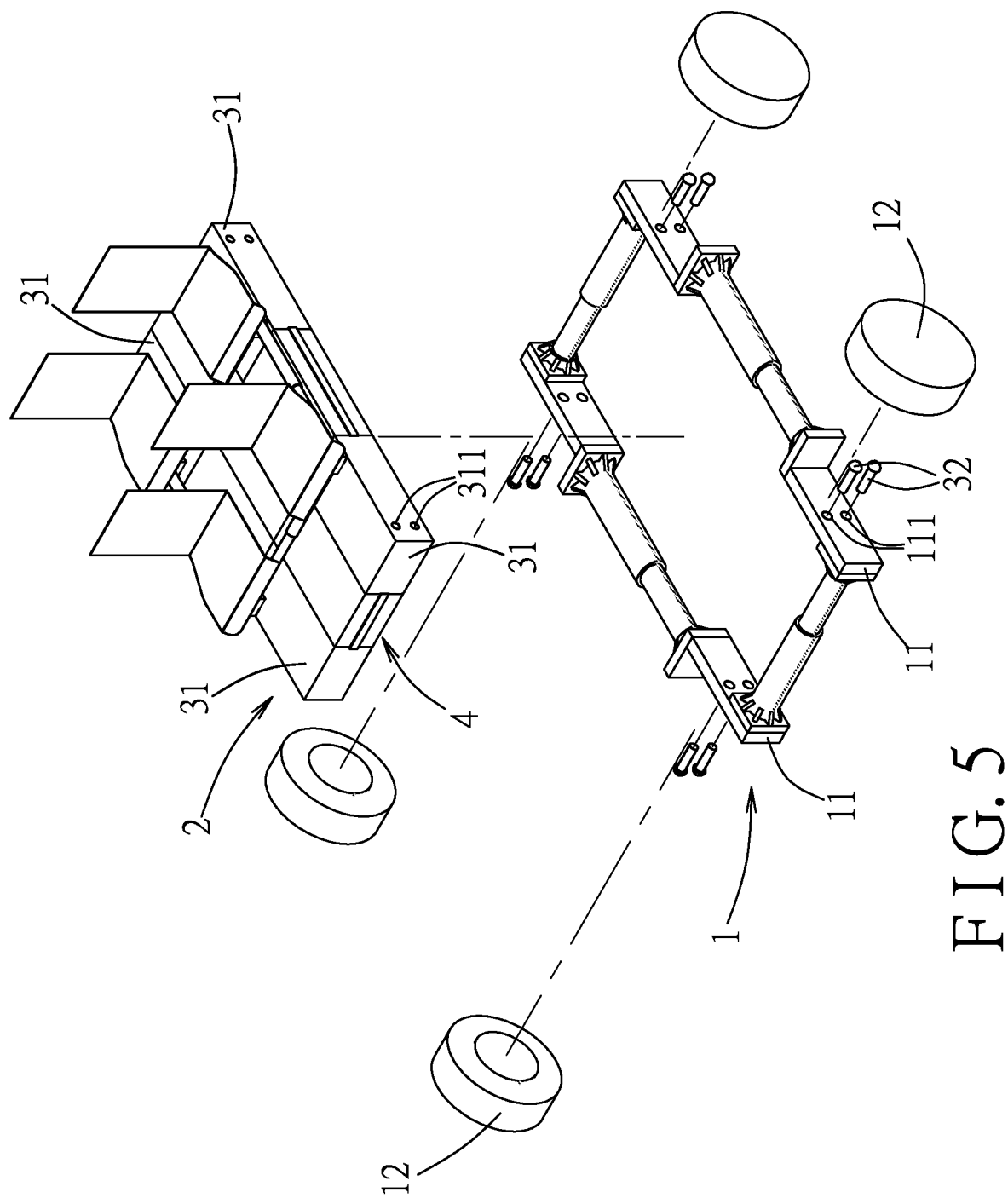
FIG. 5 is a partly exploded perspective view of the embodiment, illustrating the battery module being dismounted from the vehicle frame.

Referring to FIG. 5, to switch the electric vehicle 100 from a group passenger mode to a single passenger mode, the wheels 12 are to be disengaged from the corresponding ones of the corner plates 11. Then, the fasteners 32 that removably couple the outer batteries 31 to the outer lateral surface of the corner plates 11 are to be loosen and removed from the corresponding ones of the through holes 111 and the corresponding one of the first threaded holes 311, so that the battery module 2 can be removed from the corner plates 11 of the vehicle frame 1.

Figure 6:
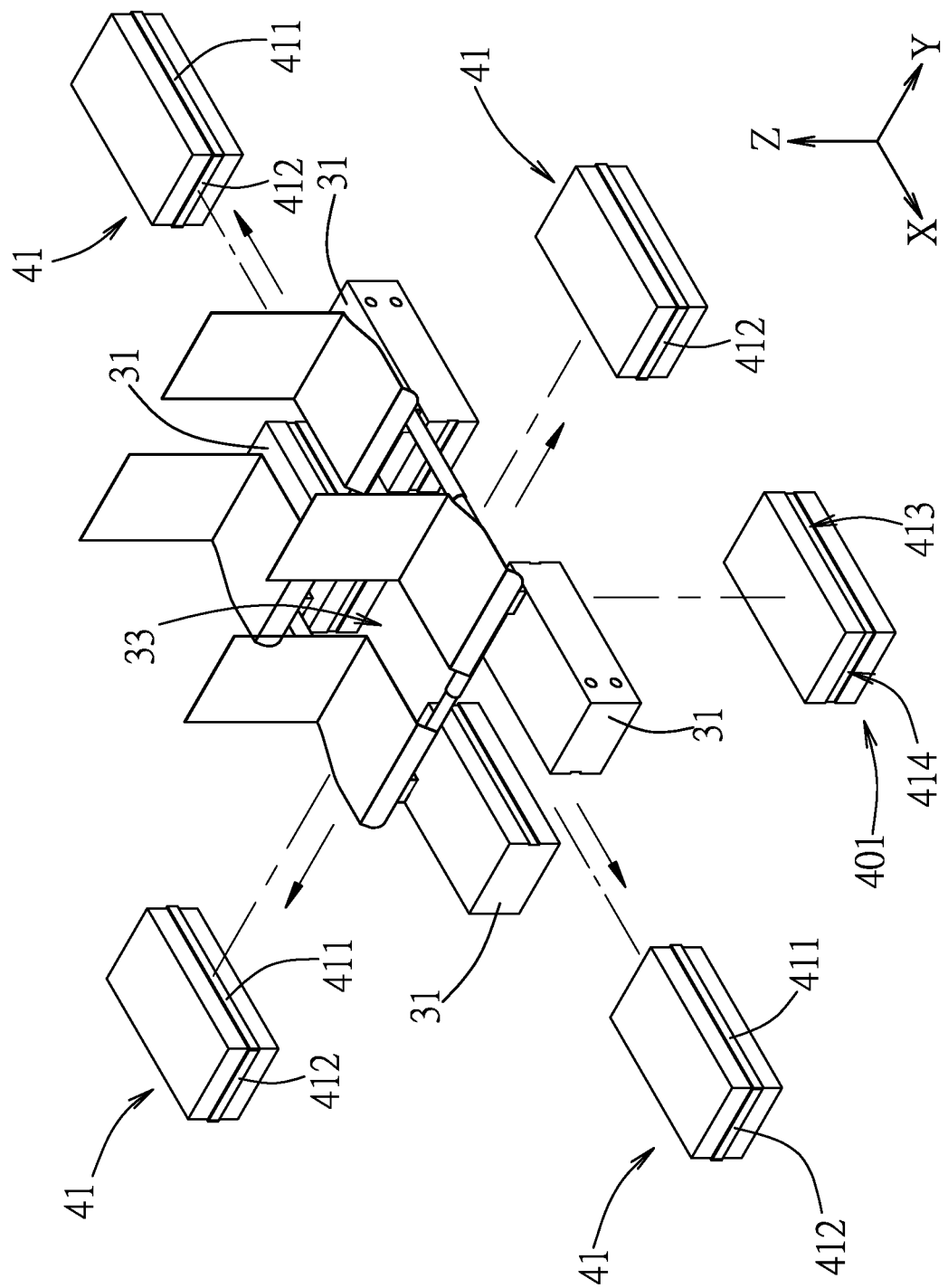
FIG. 6 is a partly exploded perspective view of the embodiment, illustrating the inner battery unit being uncoupled from the outer battery unit.

Referring to FIGS. 3 and 6, to switch from the group passenger mode to the single passenger mode, the inner battery unit 4 is to be uncoupled from the outer battery unit 3 and to be relocated elsewhere for later use. To uncouple each of the inner batteries 41 from the corresponding two of the outer batteries 31, each of the inner batteries 41 is simply pulled outwardly therefrom. When one of the inner batteries 41 is pulled in the front-rear direction (X), each of the two first guiding tongues 411 thereof slides along and away from a corresponding one of the first guiding grooves 313 of two adjacent ones of the outer batteries 31, and the second guiding tongues 412 thereof moves away from the fourth guiding grooves 414 of the central battery 401. When one of the inner batteries 41 is pulled in the lateral direction (Y), each of the two second guiding tongues 412 thereof slides along and away from a corresponding one of the second guiding grooves 314 of two adjacent ones of the outer batteries 31, and the first guiding tongues 411 thereof moves away from the third guiding grooves 413 of the central battery 401. After each of the inner batteries 41 are uncoupled, the central battery 401 may be easily taken out of the coupling space 33.

Figure 7:
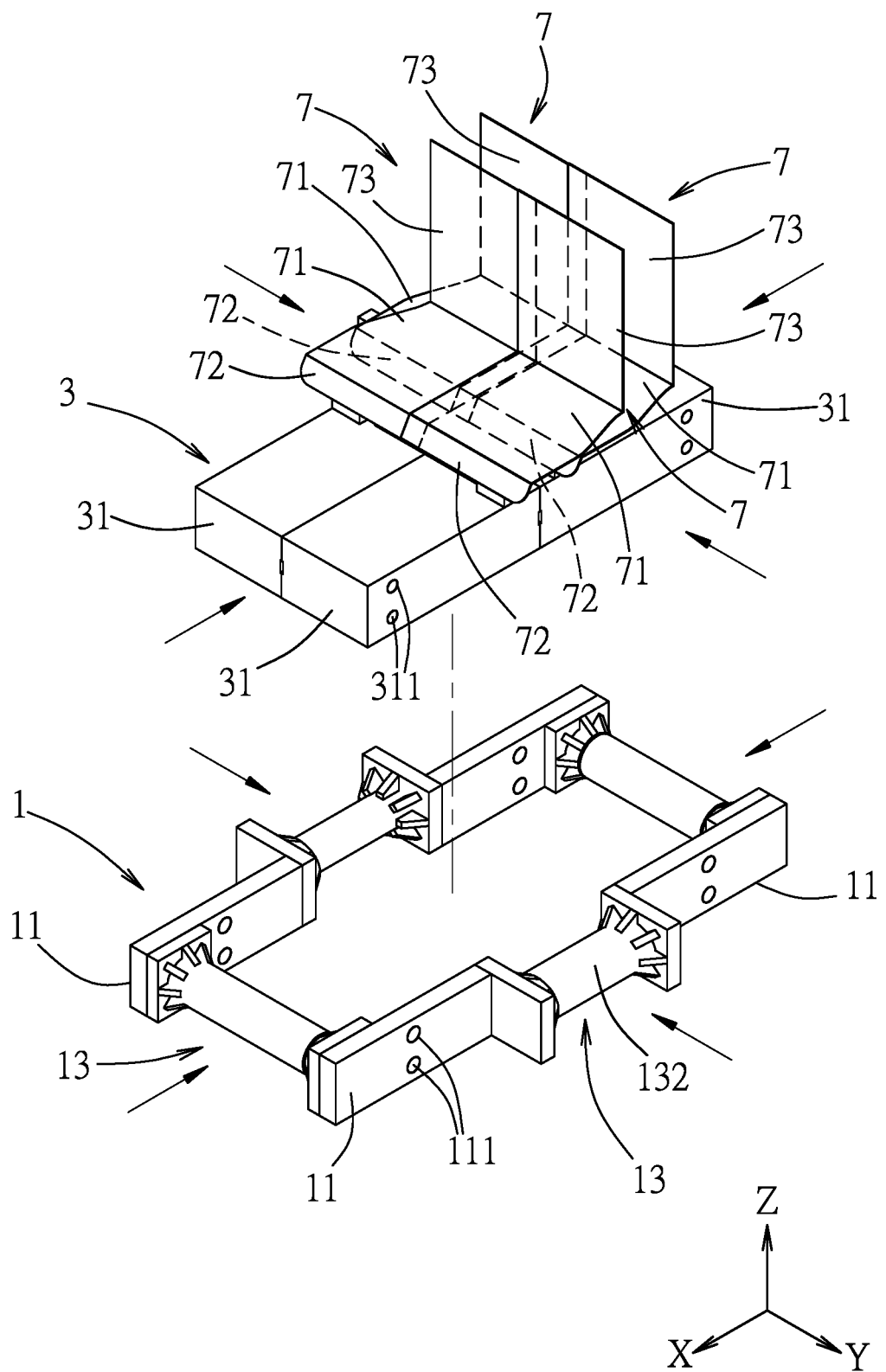
FIG. 7 is a partly exploded perspective view of the embodiment, illustrating the vehicle frame in a collapsed state.

Referring to FIGS. 4 and 7, by withdrawing the rod body 133 of each of the first telescopic rods 13 back inside the cylinder body 132 via pressurized hydraulic fluid, the vehicle frame 1 is switched to the collapsed state where the corner plates 11 move closer to center of the electric vehicle 100. Likewise, by withdrawing the rod body 62 of each of the second telescopic rods 6 back inside the cylinder body 61 via pressurized hydraulic fluid, the outer batteries 31 are switched from the separated state to the combined state where the outer batteries 31 move closer to the center of the electric vehicle 100, and the seats 7 are switched from the spaced-apart state to the overlapping state where the seats 7 move closer to the center of the electric vehicle 100. In addition, when the seats 7 are in the overlapping state 7, the sitting portions 71 of the seats 7 are partly overlapped in the up-down direction (Z), and the connecting portions 72 and the back portions 73 of any two of the seats 7 arranged in the lateral direction (Y) partly overlapped in the front-rear direction (X). When the seats 7 are in the overlapping state, only one the seats 7 is made to be available for use, optimal for catering to a single passenger.

Figure 8:
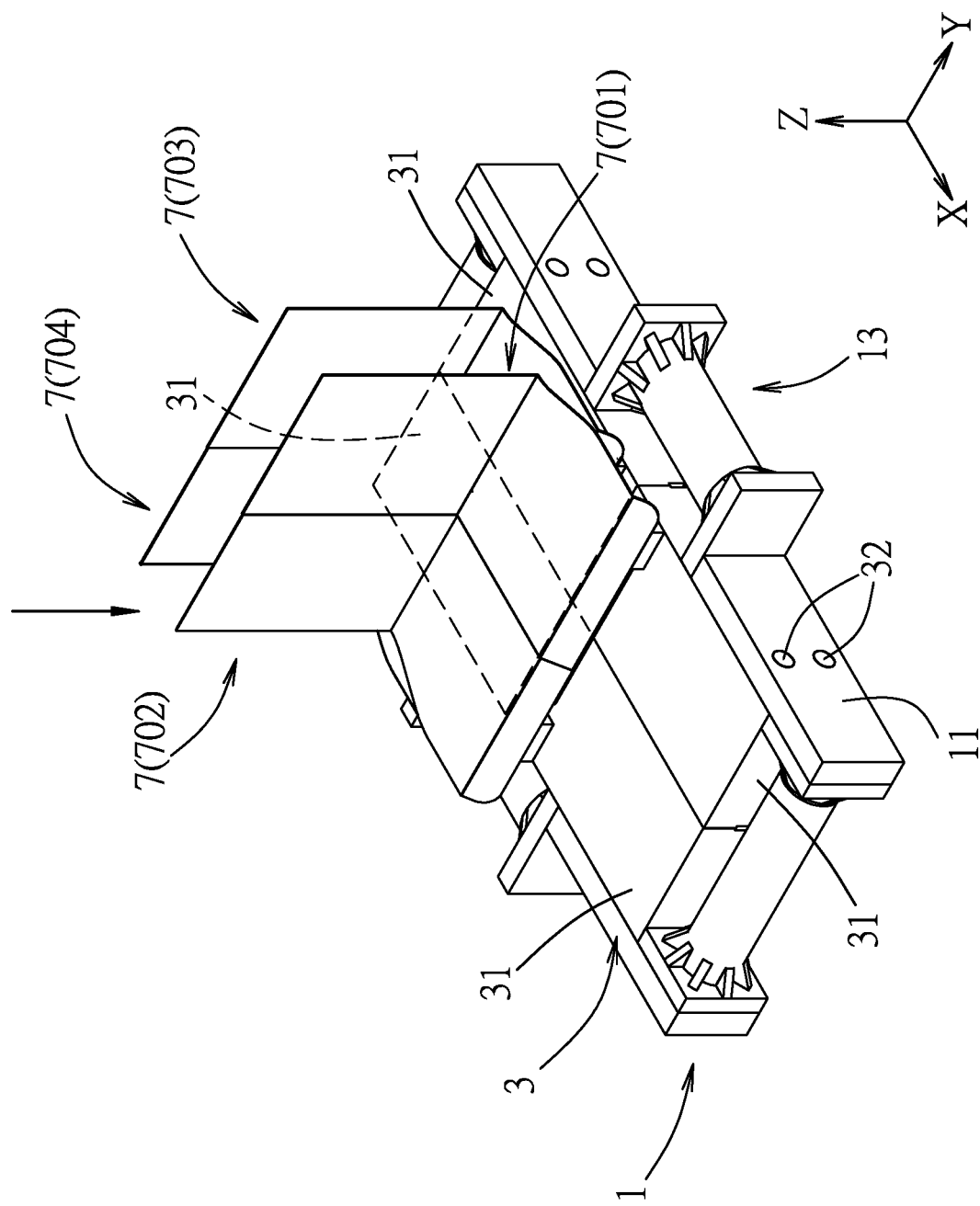
FIG. 8 is an assembled perspective view of the embodiment.
Figure 9:
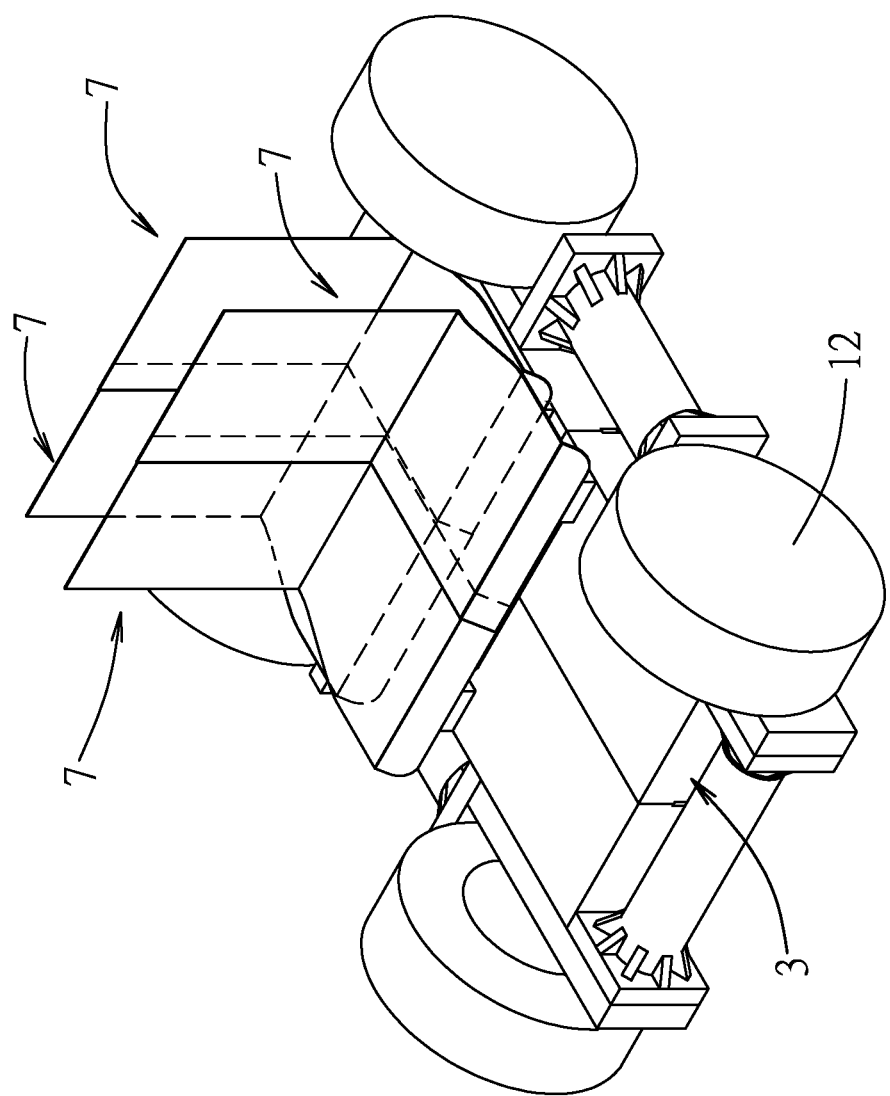
FIG. 9 is a view similar to FIG. 8, with a plurality of wheels installed to the embodiment.

Referring to FIGS. 7 to 9, after the inner battery unit 4 is removed from the electric vehicle 100, the the outer battery unit 3 may be re-coupled to the vehicle frame 1. The outer battery unit 3 is disposed in the mounting space 14, and the outer batteries 31 are respectively re-coupled to the corner plates 11 via the fasteners 32 after each of the through holes 111 of the corner plates 11 is registered with the corresponding one of the first threaded holes 311 of the outer batteries 31. Lastly, the wheels 12 are re-engaged to the corresponding ones of the corner plates 11. By removing the inner battery unit 4, weight of the battery module 2 becomes lighter, thereby reducing the overall energy consumption when the electric vehicle 100 is in single passenger mode. By reversing the order of the abovementioned operations, the electric vehicle 100 is reverted to the group passenger mode again.

Overall, by operating the vehicle frame 1 to switch between the expanded state and the collapsed state and by the design of the battery module 2 and the seat assembly 50, the electric vehicle 100 of this embodiment is suitable for use in different driving circumstances. In addition, the capability to uncouple the inner battery unit 4 from the outer battery unit 3 in single passenger mode reduces the weight of the battery module 2 when the inner battery unit 4 is uncoupled therefrom, thereby reducing the overall energy consumption when the electric vehicle 100 is in single passenger mode.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electric vehicle comprising:
a chassis including
    a vehicle frame that defines a mounting space, and
    a battery module that is disposed in said mounting space and that includes an outer battery unit mounted to said vehicle frame, and an inner battery unit removably coupled to said outer battery unit; and
a seat assembly including a plurality of seats that is mounted to said chassis;
wherein, said vehicle frame is operable to switch between an expanded state, where said inner battery unit is permitted to be coupled to said outer battery unit and said seats are spaced apart from each other, and a collapsed state, where said inner battery unit is prevented from being coupled to said outer battery unit and said seats are overlapped with each other.

2. The electric vehicle as claimed in claim 1, wherein said vehicle frame is telescopic in a front-rear direction and a lateral direction perpendicular to the front-rear direction, such that said vehicle frame is operable to switch between the expanded state and the collapsed state.

3. The electric vehicle as claimed in claim 2, wherein:
said vehicle frame has
    four corner plates, and
    four first telescopic rods, each of which has two opposite ends that are respectively and fixedly connected to two corresponding ones of said corner plates; and
two of said first telescopic rods are spaced apart from each other in the front-rear direction (X) and extend in the lateral direction (Y), and the remaining two of said first telescopic rods are spaced apart from each other in the lateral direction (Y) and extend in the front-rear direction (X) for enabling said vehicle frame to switch between the expanded state and the collapsed state by telescopically extending in both the front-rear direction (X) and the lateral direction (Y).

4. The electric vehicle as claimed in claim 3, wherein:
said outer battery unit includes four outer batteries that are respectively and removably coupled to said corner plates of said vehicle frame;
said seat assembly includes four of said seats, and further includes
    four seat supports that are respectively mounted to top surfaces of said outer batteries and that are for said seats to be respectively mounted thereto, and
    four second telescopic rods, each of which has two opposite ends that are respectively and fixedly connected to two corresponding ones of said seat supports;
two of said second telescopic rods are spaced apart from each other in the front-rear direction (X) and extend in the lateral direction (Y), and the remaining two of said second telescopic rods are spaced apart from each other in the lateral direction (Y) and extend in the front-rear direction (X).

5. The electric vehicle as claimed in claim 4, wherein:
any two of said seats arranged in the lateral direction (Y) are located relative to each other in such a way that one of said seats is located higher in a up-down direction (Z) perpendicular to the front-rear direction (X) and the lateral direction (Y), and closer to a front end of said seat assembly in the front-rear direction (X) than the other one of said seats; and
any two of said seats arranged in the front-rear direction (X) are located relative to each other in such a way that the front one of said seats is located higher in the up-down direction (Z) than the rear one of said seats.

6. The electric vehicle as claimed in claim 5, wherein:
said seat supports include a first support, a second support, a third support, and a fourth support;
said first and second supports are spaced apart from each other in the lateral direction (Y), said third and fourth supports are spaced apart from each other in the lateral direction (Y), said first and third supports are spaced apart from each other in the front-rear direction (X), and said second and fourth supports are spaced apart from each other in the front-rear direction (X);
a top end of said first support is higher than that of said second support, said top end of said second support is higher than that of said third support, and said top end of said third support is higher than that of said fourth support;
each of said seats has a sitting portion, a connecting portion that is connected to a front end of said sitting portion and that is fixedly connected to a corresponding one of said seat supports, and a back portion that is connected to a rear end of said sitting portion; and
when said vehicle frame is in the collapsed state, said sitting portions of said seats are partly overlapped in the up-down direction (Z), and said connecting portions and said back portions of any two of said seats that are arranged in the lateral direction (Y) are partly overlapped in the front-rear direction (X).

7. The electric vehicle as claimed in claim 4, wherein:
said inner battery unit includes a plurality of inner batteries;
when said vehicle frame is in the expanded state, said outer batteries are separated from each other for said inner batteries to be coupled thereamong; and
when said vehicle frame is in the collapsed state, said outer batteries abut against each other so as to prevent said inner batteries from being coupled thereamong.

8. The electric vehicle as claimed in claim 7, wherein:
said inner battery unit includes four of said inner batteries, each of which is to be removably coupled between corresponding two of said outer batteries; and
said inner battery unit further includes a central battery that is to be removably coupled to and to be disposed among said inner batteries.

9. A chassis of an electric vehicle comprising:
a vehicle frame that defines a mounting space; and
a battery module that is disposed in said mounting space and that includes an outer battery unit mounted to said vehicle frame, and an inner battery unit removably coupled to said outer battery unit;

wherein, said vehicle frame is operable to switch between an expanded state, where said inner battery unit is permitted to be coupled to said outer battery unit, and a collapsed state, where said inner battery unit is prevented from being coupled to said outer battery unit.

10. The chassis of the electric vehicle as claimed in claim 9, wherein said vehicle frame is telescopic in a front-rear direction (X) and a lateral direction (Y) perpendicular to the front-rear direction (X), such that said vehicle frame is operable to switch between the expanded state and the collapsed state.

11. The chassis of the electric vehicle as claimed in claim 10, wherein:
said vehicle frame has
four corner plates, and
four first telescopic rods, each of which has two opposite ends that are respectively and fixedly connected to two corresponding ones of said corner plates; and
two of said first telescopic rods are spaced apart from each other in the front-rear direction (X) and extend in the lateral direction (Y), and the remaining two of said first telescopic rods are spaced apart from each other in the lateral direction (Y) and extend in the front-rear direction (X) for enabling said vehicle frame to switch between the expanded state and the collapsed state by telescopically extending in the front-rear direction (X) and the lateral direction (Y).

12. The chassis of the electric vehicle as claimed in claim 11, wherein:
said outer battery unit includes four outer batteries that are respectively and removably coupled to said corner plates of said vehicle frame;
said inner battery unit includes a plurality of inner batteries;
when said vehicle frame is in the expanded state, said outer batteries are separated from each other for said inner batteries to be coupled thereamong; and
when said vehicle frame is in the collapsed state, said outer batteries abut against each other so as to prevent said inner batteries from being coupled thereamong.

13. The chassis of the electric vehicle as claimed in claim 11, wherein:
said inner battery unit includes four of said inner batteries, each of which is to be removably coupled between corresponding two of said outer batteries; and
said inner battery unit further includes a central battery that is to be removably coupled to and to be disposed among said inner batteries.

\* \* \* \* \*